United States Patent
Sokolov et al.

(10) Patent No.: US 7,065,747 B2
(45) Date of Patent: Jun. 20, 2006

(54) IDENTIFYING REFERENCES TO OBJECTS DURING BYTECODE VERIFICATION

(75) Inventors: Stepan Sokolov, Fremont, CA (US); David Wallman, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 654 days.

(21) Appl. No.: 09/851,554

(22) Filed: May 8, 2001

(65) Prior Publication Data

US 2004/0015873 A1    Jan. 22, 2004

(51) Int. Cl.
*G06F 9/44* (2006.01)
(52) U.S. Cl. .............. 717/126; 717/116; 717/118; 717/148; 717/152; 717/153; 717/154; 707/103 Z; 707/206
(58) Field of Classification Search ............ 717/118, 717/126, 148, 116, 152–154; 707/206, 103 Z
See application file for complete search history.

(56) References Cited

U.S. PATENT DOCUMENTS

| 5,682,535 | A |   | 10/1997 | Knudsen |  |
|---|---|---|---|---|---|
| 5,787,431 | A | * | 7/1998 | Shaughnessy | 707/100 |
| 5,900,001 | A |   | 5/1999 | Wolczko et al. |  |
| 5,903,899 | A | * | 5/1999 | Steele, Jr. | 707/206 |
| 6,021,469 | A | * | 2/2000 | Tremblay et al. | 711/125 |
| 6,047,125 | A | * | 4/2000 | Agesen et al. | 717/148 |
| 6,093,216 | A | * | 7/2000 | Adl-Tabatabai et al. | 717/118 |
| 6,101,580 | A | * | 8/2000 | Agesen et al. | 711/132 |
| 6,199,075 | B1 | * | 3/2001 | Ungar et al. | 707/206 |
| 6,275,227 | B1 |   | 8/2001 | DeStefano |  |
| 6,304,949 | B1 | * | 10/2001 | Houlsdworth | 707/206 |
| 6,330,709 | B1 | * | 12/2001 | Johnson et al. | 717/100 |
| 6,442,751 | B1 | * | 8/2002 | Cocchi et al. | 717/133 |
| 6,735,758 | B1 |   | 5/2004 | Berry et al. |  |

FOREIGN PATENT DOCUMENTS

| WO | WO 9848354 A |   | 10/1998 |
| WO | WO 9910811 |   | 3/1999 |
| WO | WO 9910811 A1 | * | 3/1999 |

OTHER PUBLICATIONS

Lindholm et al, "The Java™ Virtual Machine Specification", (Sep., 1996), Sun Microsystems, Inc., Chapters 1-10 (173 pp.).

(Continued)

*Primary Examiner*—Tuan Dam
*Assistant Examiner*—Michael Yigdall
(74) *Attorney, Agent, or Firm*—Beyer Weaver & Thomas, LLP

(57) ABSTRACT

An enhanced Java Bytecode verifier suitable for operation in a Java computing environment is disclosed. The enhanced Java Bytecode verifier operates to determine whether one or more Java conventional Bytecode commands within a stream of Bytecodes are likely to place a reference to a Java object on the execution stack. In one embodiment, the conventional Java Bytecode commands identified as such are translated by the enhanced Java Bytecode verifier into one or more corresponding Java commands. When a corresponding command is executed, the reference associated with the conventional Java command is placed on a reference stack as well as the execution stack.

21 Claims, 8 Drawing Sheets

OTHER PUBLICATIONS

Agesen et al., Garbage Collection and Local Variable Type-Precision Liveness in Java™ Virtual Machines, Association for Computing Machinery, New York, vol. 33, No. 5, May 19, 1998, pp. 269-279.

Barabash et al., "Mostly Accurate Stack Scanning", Proceedings of the Java/Sup Tm/ Virtual Machine Research and Technology Symposium, Monterey, California, Apr. 23 and 24, 2001, pp. 153-170.

Office Action of Dec. 23, 2003 for U.S. Appl. No. 09/851,663, filed May 8, 2001.

* cited by examiner

IDENTIFYING REFERENCES TO OBJECTS DURING BYTECODE VERIFICATION

CROSS-REFERENCE TO RELATED APPLICATIONS

This application is related to U.S. patent application Ser. No. 09/851,663, entitled "IDENTIFYING AND TRACKING OBJECT REFERENCES IN A JAVA PROGRAMMING ENVIRONMENT", filed on an even date, and hereby incorporated herein by reference for all purposes.

BACKGROUND OF THE INVENTION

The present invention relates generally to object-based high level programming environments, and more particularly, to techniques for tracking references to objects defined in object-based high level programming environments.

Recently, the Java programming environment has become quite popular. The Java programming language is a language that is designed to be portable enough to be executed on a wide range of computers ranging from small devices (e.g., pagers, cell phones and smart cards) up to supercomputers. Computer programs written in the Java programming language (and other languages) may be compiled into Java Bytecode instructions that are suitable for execution by a Java virtual machine implementation.

The Java virtual machine is commonly implemented in software by means of an interpreter for the Java virtual machine instruction set but, in general, may be software, hardware, or both. A particular Java virtual machine implementation and corresponding support libraries together constitute a Java runtime environment.

Computer programs in the Java programming language are arranged in one or more classes or interfaces (referred to herein jointly as classes or class files). Such programs are generally platform, i.e., hardware and operating system, independent. As such, these computer programs may be executed without modification on any computer that is able to run an implementation of the Java runtime environment.

Object-oriented classes written in the Java programming language are compiled to a particular binary format called the "class file format." The class file includes various components associated with a single class. These components can be, for example, methods and/or interfaces associated with the class. In addition, the class file format can include a significant amount of ancillary information that is associated with the class. The class file format (as well as the general operation of the Java virtual machine) is described in some detail in *The Java Virtual Machine Specification, Second Edition*, by Tim Lindholm and Frank Yellin, which is hereby incorporated herein by reference.

As an object-oriented programming language, Java utilizes the programming concept known as an object. In the Java programming environment, Java objects are created (instantiated) from Java classes. Typically, Java objects are stored in a heap memory portion (heap). To illustrate, F*ig.*1 depicts a computing environment 100 including a heap memory portion 102 suitable for storing Java objects. As shown in FIG. 1, various Java objects, for example, objects $O_1$, $O_2$, $O_3$, $O_4$, $O_5$ and $O_6$ can be stored in the heap memory portion 102. A Java object in the memory portion 102, for example, Java object $O_3$, can include a reference to its class, as well as one or more other fields describing data (e.g., variables) associated with the object. The Java object $O_3$ can also include references to other Java objects, for example, Java objects $O_4$ and $O_5$, which are also stored in the heap memory portion 102.

Java objects are typically created in the heap memory portion 102 when they are instantiated. After a Java object has been instantiated, it can be referenced from various points in the Java program. For example, the object $O_3$ can be referenced by a local variable 104 of the Java program. During the execution time of the Java program, as depicted in FIG. 1, the local variable 104 can be on an execution stack 106 in a stack frame portion 108. The stack frame portion 108 represents the stack frame for a method associated with the local variable 104. The stack frame portion 108 is typically placed on the execution stack 106 when the associated method is invoked.

In addition to the local variables associated with the method, the stack frame portion 108 also includes an operand stack portion 110 suitable for placing various operands on the execution stack 106. In the Java programming environment, these operands are placed on the operand stack portion 110 of the execution stack 106 in order to execute the Java method associated with the stack frame 108. As is known to those skilled in the art, these operands can be references to objects stored in the heap memory portion 102, e.g., an operand 112 referencing the Java object $O_3$.

As is known to those skilled in the art, there may be a need to identify and track references to Java objects for various reasons. For example, during the course of the execution of Java programs, some of the objects in the heap memory portion 102 are no longer needed (i.e., become "dead objects" which are no longer reachable by the Java program). Accordingly, it is desirable to identify the "dead" objects in the heap memory portion 102 and remove them from the heap. This operation can be referred to as "garbage collection."

As noted above, entries of the execution stack can be references to Java objects stored in the heap memory portion. Therefore, to perform garbage collection for Java programs, there is a need to identify entries on the execution stack that are references to objects stored on the heap memory portion. The conservative approach to garbage collection would require traversing the execution stack and identifying every entry on the stack that could potentially be a reference to an object in the heap. Unfortunately, this conservative approach typically results in identifying dead objects as live objects. Since an object in the heap may refer to other objects, identifying a dead object as a live one can seriously hinder garbage collection.

Another approach to garbage collection seeks to identify references to live objects more accurately. However, this approach requires use of another interpreter, namely, the abstract interpreter. The abstract interpreter essentially simulates the execution of Java methods and operates when the main interpreter is suspended. Thus, the use of an abstract interpreter can adversely effect performance of Java programs. Moreover, devoting memory space and execution time to use an interpreter is not a feasible method for computing systems with relatively limited resources (e.g., embedded systems with relatively smaller memory and computing power).

In view of the foregoing, there is a need for improved techniques for tracking and identifying references to Java objects.

SUMMARY OF THE INVENTION

Broadly speaking, the present invention relates to improved techniques for identifying and tracking references to Java objects. In accordance with one aspect of the invention, an enhanced Java Bytecode verifier suitable for operation in a Java computing environment is disclosed. The enhanced Java Bytecode verifier operates to determine whether one or more Java conventional Bytecode commands within a stream of Bytecodes are likely to place a reference to a Java object on the execution stack. In one embodiment, the conventional Java Bytecode commands identified as such are translated by the enhanced Java Bytecode verifier into one or more corresponding inventive commands. When an inventive command is executed, the reference associated with the conventional Java command is placed on a reference stack as well as the execution stack.

The invention can be implemented in numerous ways, including as a method, an apparatus, a computer readable medium, and a database system. Several embodiments of the invention are discussed below.

As a method of tracking references to objects of an object-oriented programming language, one embodiment of the invention includes the acts of: determining whether a command is likely to place a reference to an object on an execution stack of the object-oriented programming environment; translating the command into another command when it is determined that the command is likely to place a reference to an object on an execution stack of the object-oriented programming environment; and placing a reference to the object on a reference stack associated with the execution stack when the another command is executed.

As a method of tracking references to Java objects during Bytecode verification, another embodiment of the invention includes the acts of: determining whether the Java command is likely to place the only reference to a Java object on the execution stack; translating the command into an inventive command when it is determined that the Java command is likely to place the only reference to a Java object on the execution stack; executing the inventive Java command; and placing a reference to the object on a reference stack associated with the execution stack when the new Java command is executed.

One embodiment of the invention includes a Java Bytecode verifier suitable for operating in a Java operating environment, wherein the Bytecode verifier operates to determine whether there is at least one Java command in a stream of Java Bytecode commands such that the at least one Java command is likely to place the only reference to a Java object on the execution stack. In addition, the Bytecode verifier operates to translate the Java command into another Java command; when the Java command is likely to place the only reference to a Java object on the execution stack. When the command is executed, a reference associated with the command is placed on the reference stack, as well as the execution stack.

As a computer readable medium including computer program code for tracking references to objects of an object-oriented programming environment, one embodiment of the invention includes: computer program code for determining whether a command is likely to place a reference to an object on an execution stack of the object-oriented programming environment; computer program code for translating the command into another command when the determining determines that the command is likely to place a reference to an object on an execution stack of the object-oriented programming environment; and computer program code for placing a reference to the object on a reference stack associated with the execution stack when the another command is executed.

These and other aspects and advantages of the present invention will become more apparent when the detailed description below is read in conjunction with the accompanying drawings.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The present invention pertains to improved techniques for identifying and tracking references to Java objects. As will be appreciated, the techniques can be used in a variety of applications. For example, the techniques can be used to implement garbage collection methods for Java programs in a manner that is more efficient, especially for systems with limited resources (e.g., embedded systems).

In accordance with one aspect of the invention, a reference stack suitable for storing references to Java objects is disclosed. In one embodiment, for each execution stack, a reference stack is designated. In fact, the reference stack can be used to store references to Java objects in the same offset as they appear in the corresponding execution stack. In accordance with another aspect of the invention, references to Java objects can be identified based on the values stored in the reference stack. In one embodiment, the reference stack is traversed to identify the entries that correspond to active Java objects. These entries are then checked against the corresponding entries in the execution stack to ensure with a greater degree of certainty that the identified entries represent references to active Java objects. The described techniques can be implemented to efficiently identify and track references to Java objects. Accordingly, the invention can be implemented to improve various applications (e.g., garbage collection). As a result, performance of virtual machines, especially those with relatively limited resources, is improved.

In accordance with yet another aspect of the invention, an enhanced Java Bytecode verifier, suitable for operation in a Java computing environment is disclosed. The enhanced Java Bytecode verifier operates to determine whether one or more Java conventional Bytecode commands within a stream of Bytecode commands are likely to place a reference to a Java object on the execution stack. In one embodiment, the conventional Java Bytecode commands identified as such are translated by the enhanced Java Bytecode verifier into one or more corresponding inventive commands. When an inventive command is executed, the reference associated with the conventional Java command is placed on the reference stack as well as the execution stack.

Embodiments of the invention are discussed below with reference to FIGS. 2–8. However, those skilled in the art will readily appreciate that the detailed description given herein with respect to these figures is for explanatory purposes only as the invention extends beyond these limited embodiments.

Figure 1:
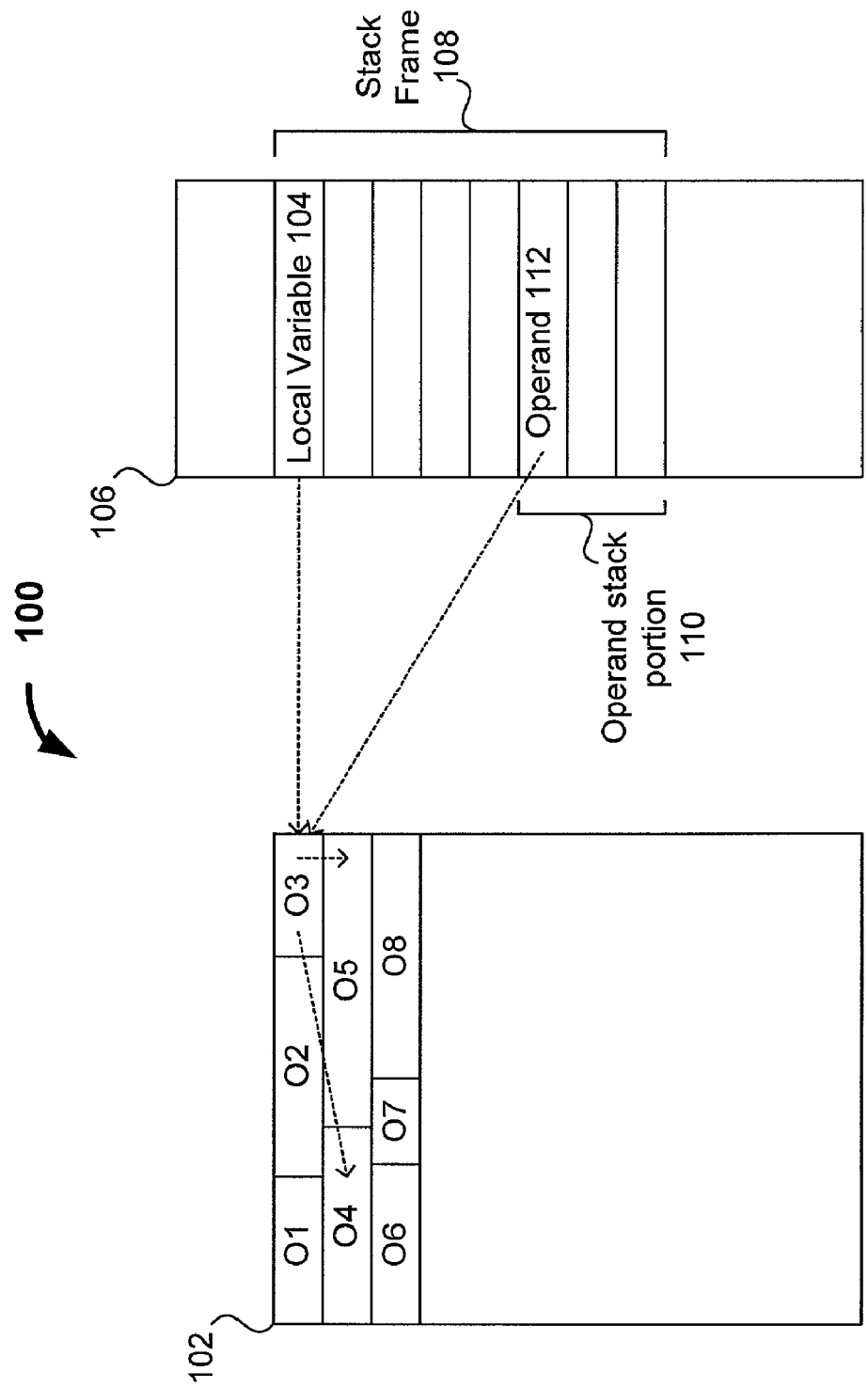
FIG. 1 depicts a computing environment including a heap memory portion suitable for storing Java objects.
Figure 2:
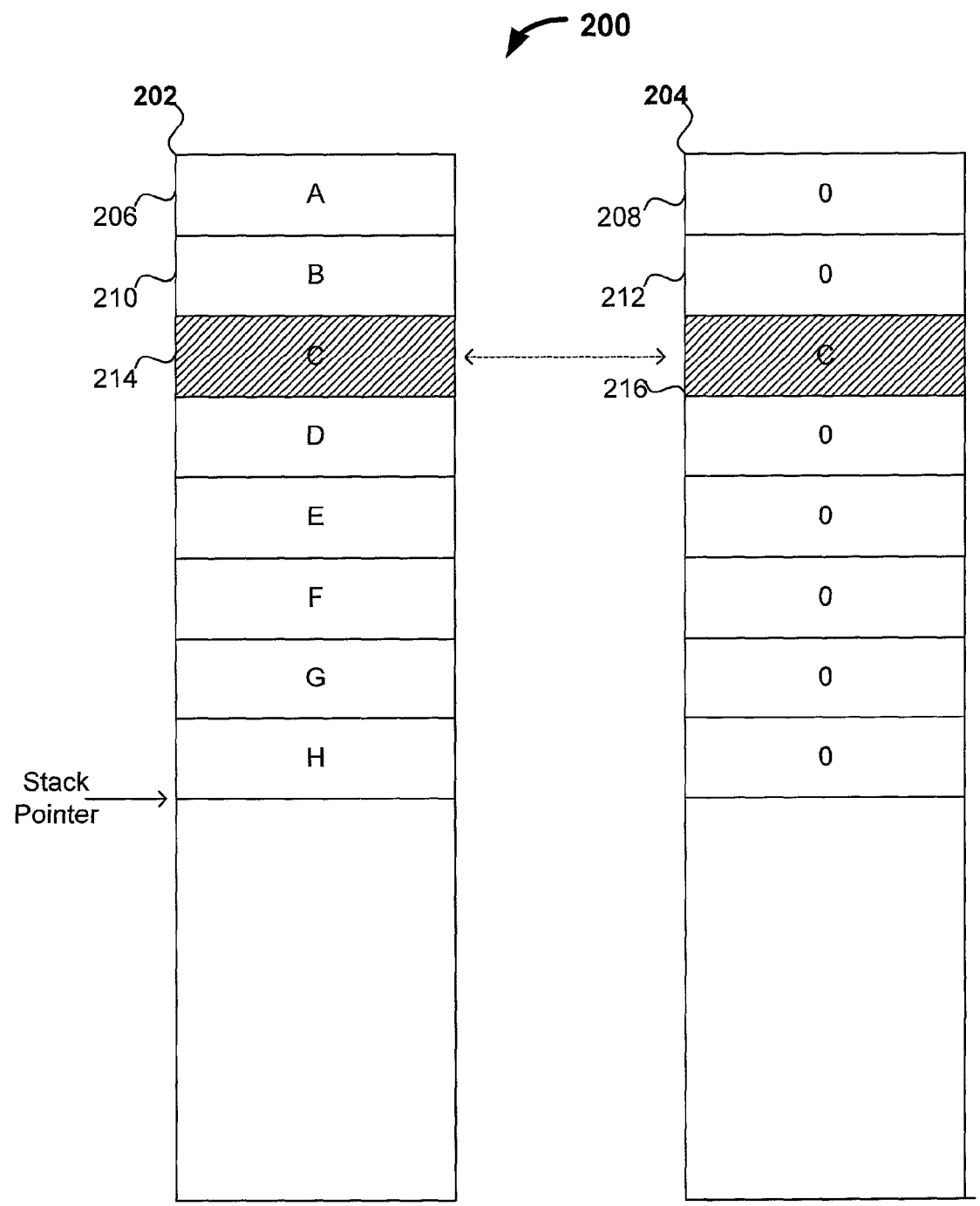
FIG. 2 represents an object-oriented computing environment in accordance with one embodiment of the invention.

FIG. 2 represents an object-oriented computing environment 200 in accordance with one embodiment of the invention. The computing environment 200 includes an execution stack 202 and a reference stack 204. The execution stack 202 can be of a predetermined size (e.g., 2 Kilo Bytes (KB), 4 KB, 8 KB). As will be appreciated, the execution stack 202 can be implemented in a similar manner as a conventional execution stack (e.g., execution stack 106 of FIG. 1). However, unlike conventional computing environments, the computing environment 200 includes the reference stack 204.

In the described embodiment, the reference stack 204 is allocated to be the same size as the execution stack 202. In fact, there is a one to one correspondence between the entries of the reference stack 204 and the entries of the execution stack 202. In other words, reference stack 204 may be implemented as a mirror image of the execution stack 202. As such, for an entry 206 in the execution stack 202, there is the corresponding entry 208 of the reference stack 204, and for another entry 210 in the execution stack 202, there is the corresponding entry 212 in the reference stack 204, and so forth.

As shown in FIG. 2, the value stored in the entry 216 of the reference stack 204 is the same as the value stored in the entry 214 of the execution stack 202. This value can represent a reference to a Java object in the heap. It should be noted that the entry 216 of the reference stack 204 and the entry 214 of the execution stack 202 also have the same offset. Accordingly, the reference stack 204 can be used to store references to Java objects in the same offset as they appear in the execution stack 202. It should also be noted that the entries that do not represent a reference to an object can be set to a predetermined value that cannot represent a reference value (e.g., zero).

Figure 3:
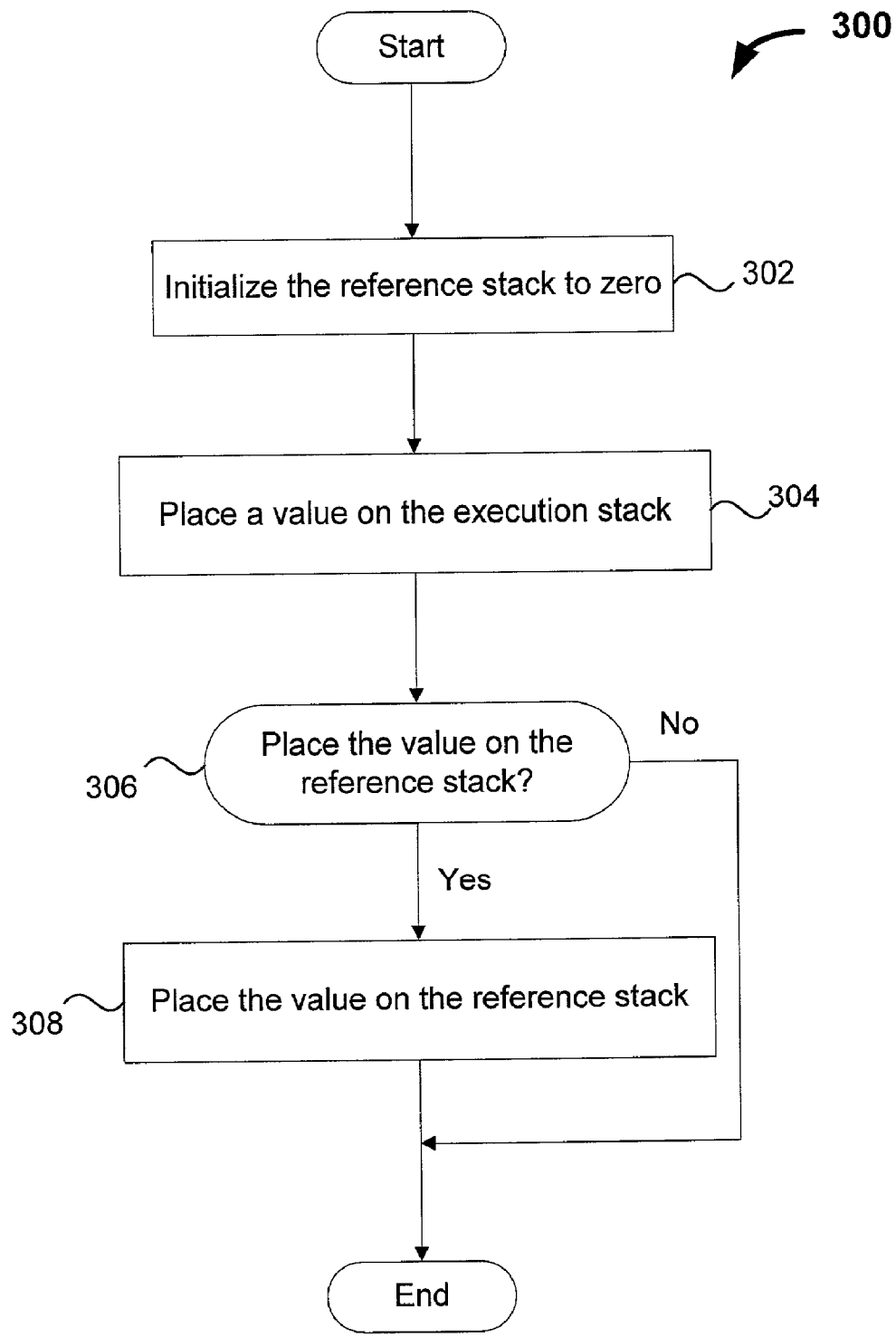
FIG. 3 illustrates a method for tracking references to Java objects in accordance with one embodiment of the invention.

FIG. 3 illustrates a method 300 for tracking references to Java objects in accordance with another embodiment of the invention. The method 300 can, for example, be implemented in the computing environment 200 described above in order to place references to Java objects in the reference stack 204. Initially, at operation 302, the reference stack is initialized to zero. Next, at operation 304, a value is placed on the execution stack. Thereafter, at operation 306, a determination is made as to whether the value placed on the execution stack should also be placed on the reference stack. If it is determined at operation 306 that the value placed on the execution stack should not be placed on the reference stack, the method 300 ends. On the other hand, if it is determined at operation 306 that the value placed on the execution stack should also be placed on the reference stack, the method 300 proceeds to operation 308 where the value placed on the execution stack is also stored on the reference stack in an appropriate entry.

Figure 4:
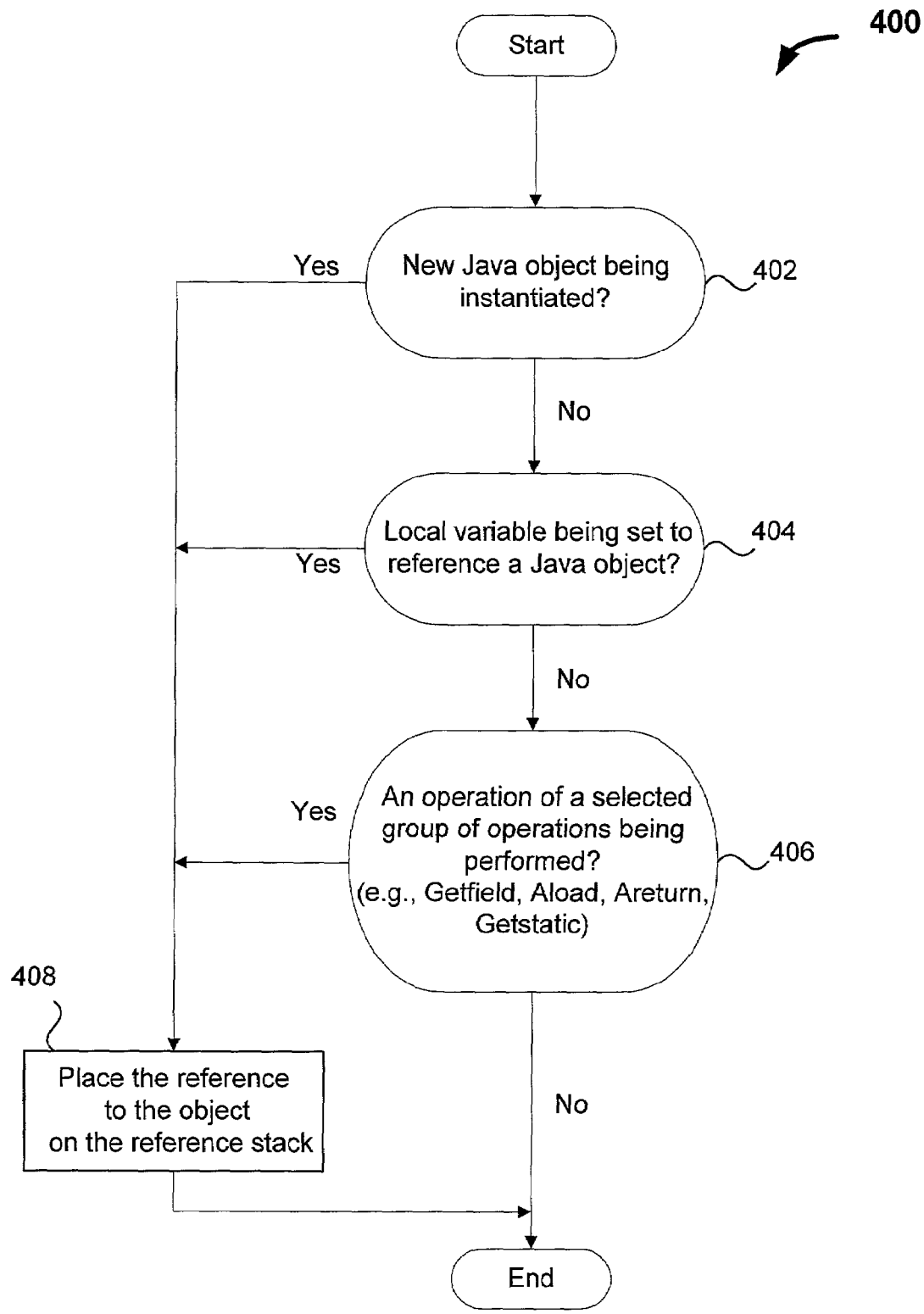
FIG. 4 illustrates a method for determining whether a value should be stored in the reference stack.

To further elaborate, FIG. 4 illustrates a method 400 for determining whether a value should be stored in the reference stack. The method 400 represents, for example, processing that can be performed at operation 306 of FIG. 3. The method 400 can, for example, be performed during a garbage collection cycle. First, at operation 402, a determination is made as to whether a new Java object is being instantiated. If it is determined at operation 402 that a new Java object is being instantiated, the method 400 proceeds to operation 408 where the reference to the Java object is placed on the reference stack. On the other hand, if it is determined at operation 402 that a new object is not being instantiated, the method 400 proceeds to operation 404 where a determination is made as to whether a local variable is being set to reference a Java object. If it is determined at operation 404 that a local variable is being set to reference the Java object, the method 400 proceeds to operation 408 where the reference to the object is placed on the reference stack. However, if it is determined at operation 404 that a local variable is not being set to reference the Java object, the method 400 proceeds to operation 406 where it is determined whether an operation of a selected group of operations is being performed. In one embodiment, the selected group of operations includes operations that are likely to place a reference to an object on the execution stack. This selected group of operations can include Getfield, Aload, Areturn, and Getstatic Bytecode operations. These Java (Bytecode) operations are known to those skilled in the art.

Moreover, as will be appreciated, the determinations made at operations 402, 404 and 406 can be performed during Bytecode verification. Bytecode verification is typically performed for Java programs to ensure that no programming violation has occurred. As such, the method 400 can be efficiently implemented since Bytecode verification is typically performed anyway. The method 400 ends following the operation 408 or if it is determined at operation 406 that an operation of the selected group of operations is not being performed.

Figure 5:
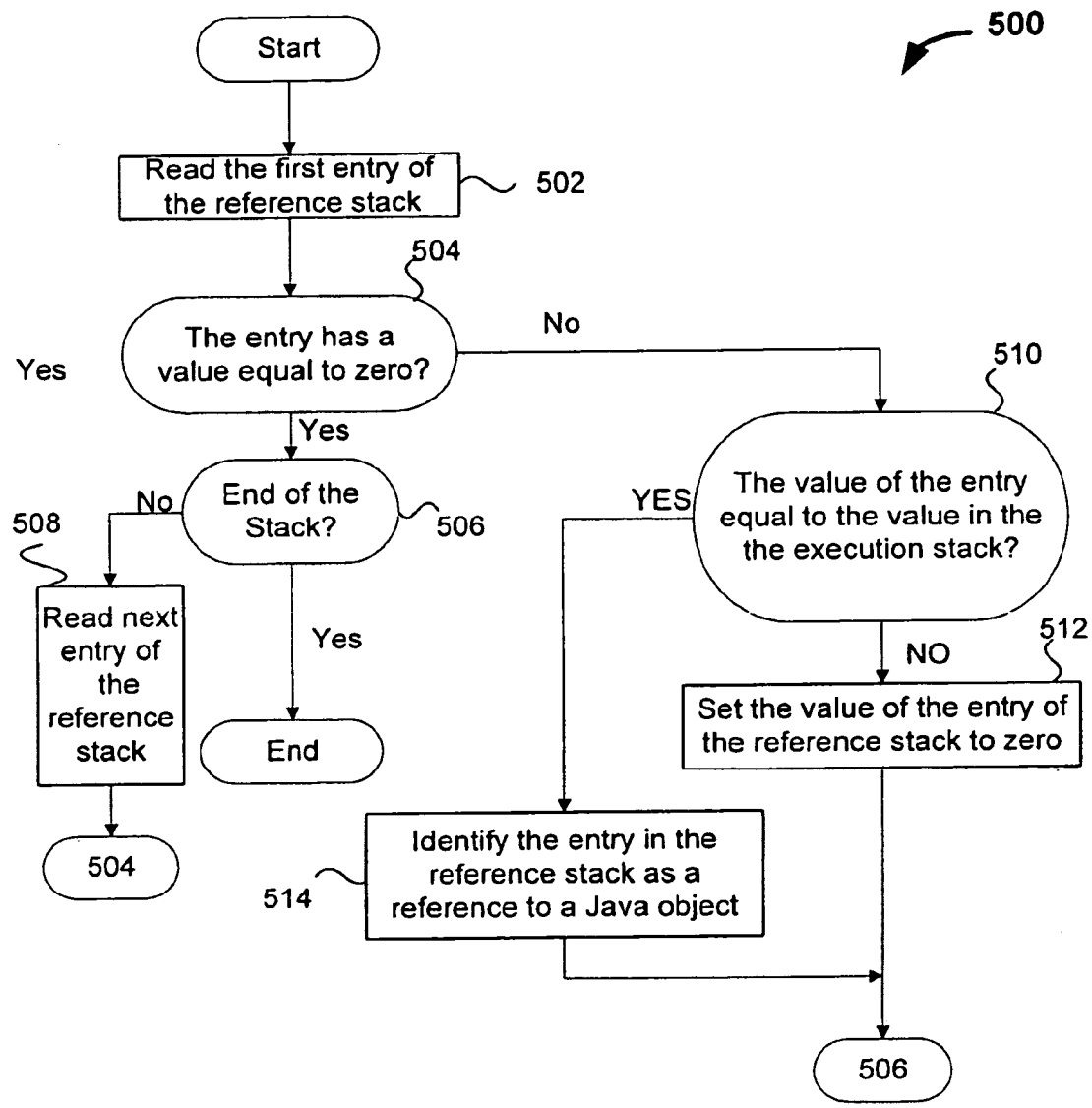
FIG. 5 illustrates a method for identifying references to Java objects.

As noted above, the reference stack can be used to store references to Java objects. Accordingly, the reference stack can be used to identify references to Java objects. FIG. 5 illustrates a method for identifying references to Java objects. Initially, at operation 502, the first entry in the reference stack is read. Next, at operation 504, a determination is made as to whether the entry in the reference stack has a value that is equal to zero. If it is determined at operation 504 that the value stored in the entry equals zero, the method 500 proceeds to operation 506 where it is determined whether the end of the stack has been reached. If it is determined that the end of the stack has been reached, the method 500 ends. However, if it is determined that the end of the stack has not been reached, the method 500 proceeds to operation 508 where the next entry in the reference stack is read. Thereafter, the method 500 proceeds to operation 504 where it is determined whether the entry has a value that is equal to zero.

If it is determined at operation 504 that the entry has a value that is not equal to zero, the method 500 proceeds to operation 510 where it is determined whether the value of the entry in the reference stack is equal to the value found in the corresponding entry of the execution stack. If it is determined at operation 510 that the value of the entry in the reference stack is not equal to the value found in the corresponding entry of the execution stack, the method 500 proceeds to operation 512 where the value of the entry in the reference stack is set to zero. Next, the method 500 proceeds to operation 506 where it is determined whether the end of the stack has been reached. Thereafter, the method 500 proceeds in a similar manner as described above.

On the other hand, if it is determined at operation 510 that the value of the entry in the reference stack is equal to the value found in the corresponding entry of the execution stack, the method 500 proceeds to operation 514 where the entry in the reference stack is identified as a reference to a Java object. Next, the method 500 proceeds to operation 506 where it is determined whether the end of the stack has been reached. Thereafter, the method 500 proceeds in a similar manner as discussed above. When it is determined at operation 506 that the end of the reference stack has been reached, the method 500 ends.

Figure 6:
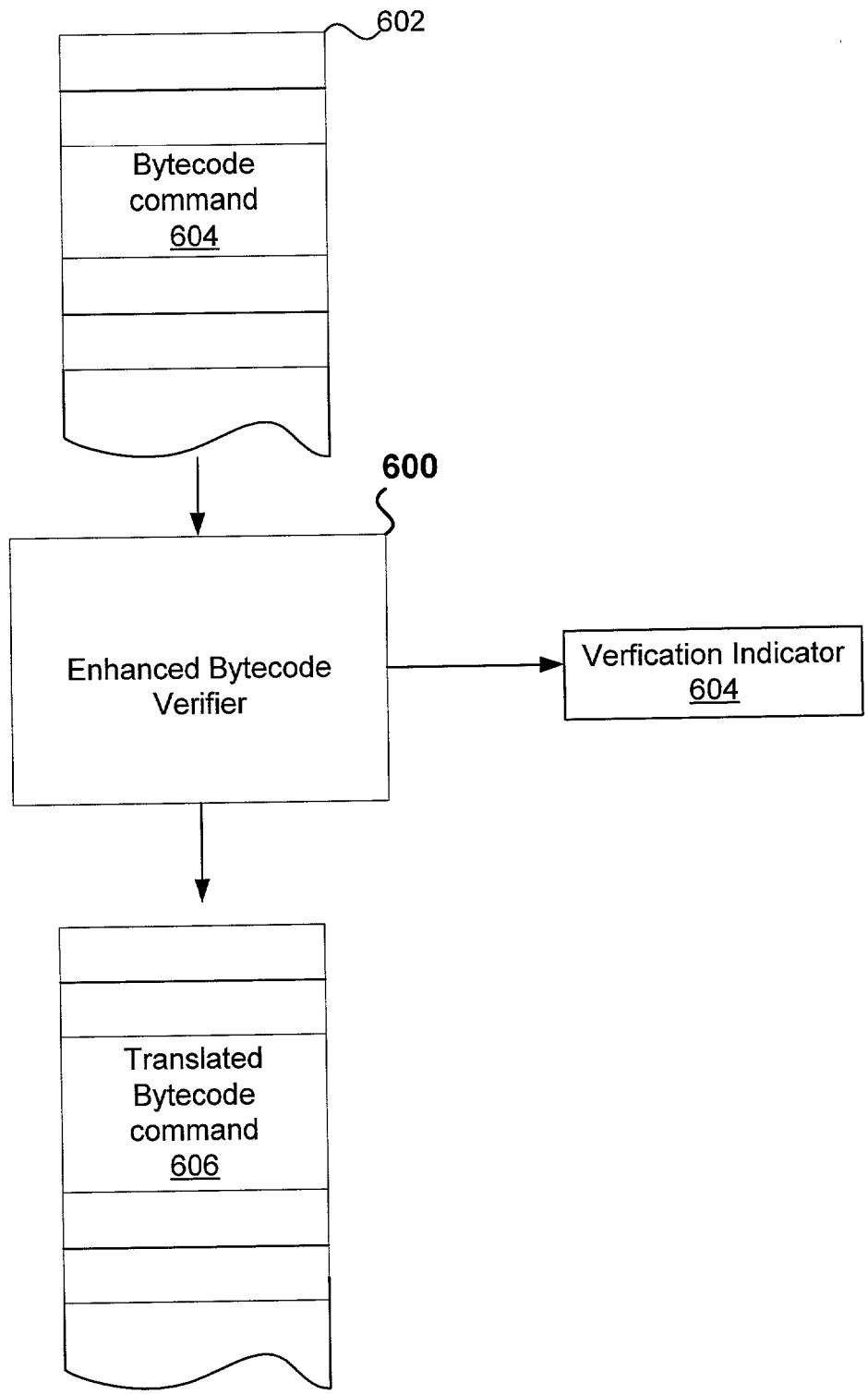
FIG. 6 depicts an enhanced Bytecode verifier in accordance with one embodiment of the invention.

As noted above, Bytecode verification is typically performed for Java programs to ensure that no programming violation has occurred. As such, some of the inventive techniques (e.g., techniques illustrated in method 400) can be efficiently performed during Java Bytecode verification since this operation is typically performed anyway. FIG. 6 depicts an enhanced Bytecode verifier 600 in accordance with one embodiment of the invention. Similar to conventional Bytecode verifiers, the enhanced Bytecode verifier 600 can receive a stream of Bytecodes 602 that typically represent the code attributes of a Method. In addition, the Bytecode verifier 600 outputs a verification indicator 604 to indicate whether the input Bytecode stream 602 has violated any rules or not. However, unlike conventional Bytecode verifiers, the Bytecode verifier 600 can determine whether one or more Bytecode commands or (opcodes) in the input Bytecode stream 602 will cause a reference to be placed on the execution stack, wherein that reference is likely to be the only reference to a Java object. Furthermore, the Bytecode verifier 600 can translate Bytecodes that are likely to place the only reference to a Java object, to one or more corresponding Bytecodes. For example, a conventional Bytecode 604 in the Bytecode command 602 can be identified as such and translated to an inventive Bytecode command 606 which indicates that the reference to the Java object is to be placed on the execution stack. Accordingly, when the inventive Bytecode command 606 is executed, the reference to the Java object is placed both on the reference stack and execution stack.

Figure 7:
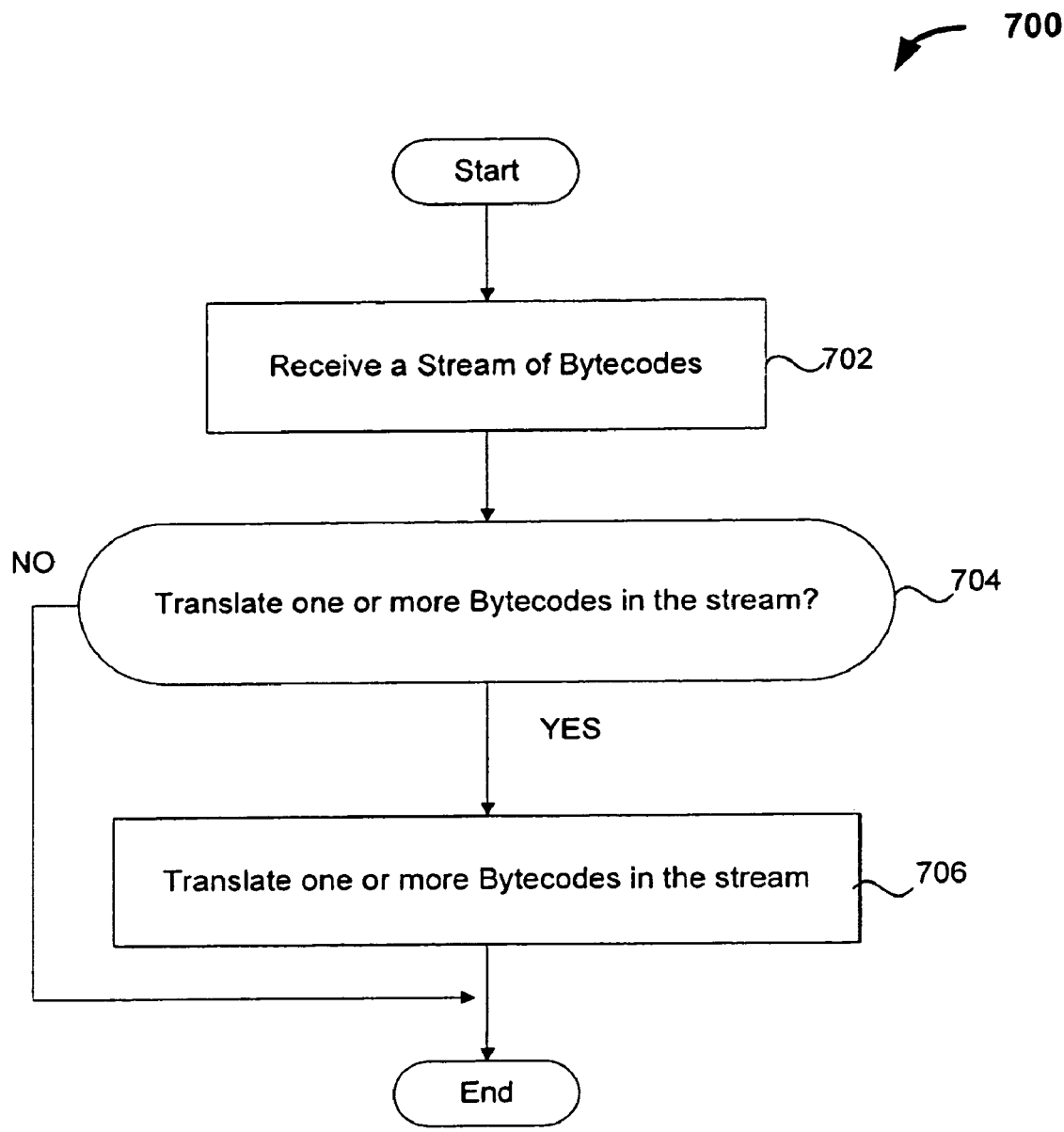
FIG. 7 illustrates a method for performing Bytecode verification in accordance with one embodiment of the invention.

FIG. 7 illustrates a method 700 for performing Bytecode verification in accordance with one embodiment of the invention. The method 700 can, for example, be performed by the Bytecode verifier 600 of FIG. 6. Initially, at operation 702, a stream of Bytecodes are received. Next, at operation 704, a determination is made as to whether one or more Bytecodes in the stream should be translated. If it is determined at operation 704 that no Bytecodes should be translated, the method 700 ends. However, if it is determined at operation 704 that there is at least one Bytecode that needs to be translated, the method 700 proceeds to operation 706 where the one or more Bytecodes are translated. It should be noted that, typically, Bytecode representing commands are translated.

Figure 8:
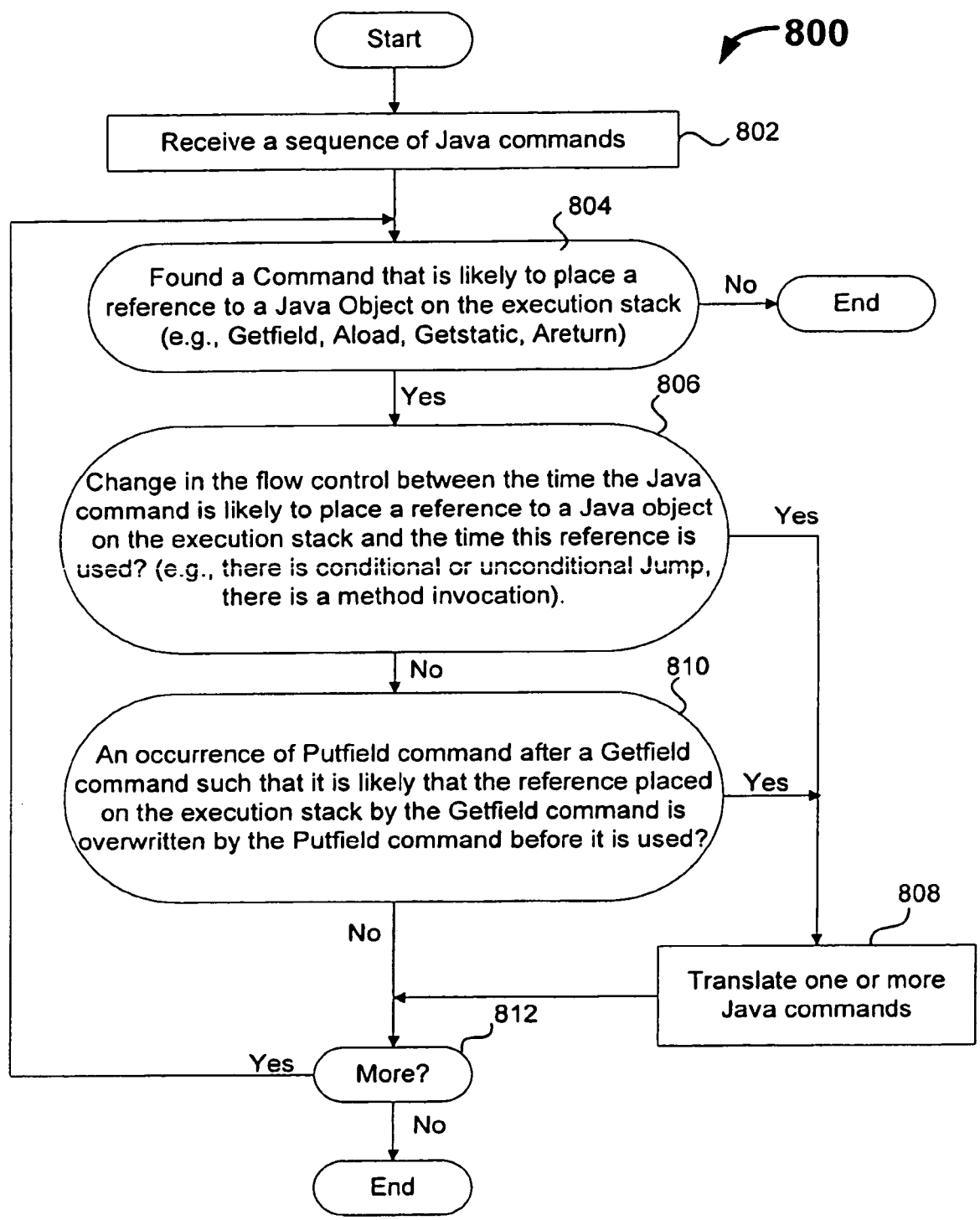
FIG. 8 depicts a method for determining whether one or more commands in a Bytecode stream should be translated in accordance with one embodiment of the invention.

It should also be noted that the translated Bytecodes can represent those commands that are likely to place a reference to a Java object on the execution stack. Moreover, these translated Bytecodes can be in a sequence of commands that are likely to manipulate the execution stack in a manner that the reference placed on the execution stack is the only reference to a Java object on the execution stack. To illustrate, FIG. 8 depicts a method 800 for determining whether one or more commands in a Bytecode stream should be translated in accordance with one embodiment of the invention. The method 800 can, for example, represent processing performed at operation 704 of FIG. 7. Initially, at operation 802, a sequence of Java commands are received. It should be noted that each of the Java commands can have one or more associated parameters. Next, at operation 804, a determination is made as to whether a Java command has been found in the sequence of Java commands that is likely to place a reference to a Java object on the execution stack (e.g., Getfield, Aload, Getstatic, Areturn). If it is determined at operation 804 that a Java command that is likely to place a reference to a Java object on the execution stack has not been found, the method 800 ends.

However, if it is determined at operation 804 that a Java command that is likely to place a reference to a Java object on the execution stack has been found, the method 800 proceeds to operation 806 where it is determined whether there is a change in the flow control between the time the Java command may place a reference to a Java object on the stack and the time this reference is used (e.g., there is conditional or unconditional Jump, there is a method invocation).

If it is determined at operation 806 that there is a change in the flow control between the time the Java command may place a reference to a Java object on the stack and the time this reference is used, the method proceeds to operation 808 where the Java command that is likely to put a reference to a Java object on the stack is translated. As will be appreciated, the translated Java command is highly likely to place a reference that is the only reference to a particular Java object in the heap.

On the other hand, if it is determined at operation 806 that there is no change in the flow control between the time the Java command may place a reference to a Java object on the stack and the time this reference is used, the method 800 proceeds to operation 808 810 where it is determined if there is an occurrence of Putfield command after a Getfield command such that the reference placed on the execution stack by the Getfield command is likely to be overwritten by the Putfield command before it is used. If this is the case, the method proceeds from operation 810 to operation 808 where the Getfield command and/or Putfield command are translated. However, if it is determined at operation 808 that this is not the case, the method 800 proceeds to operation 812 where it is determined whether there is at least one more command found in the sequence of Java commands that is likely to place a reference to a Java object on the execution stack. If it is determined at operation 812 that there is at least one more command found that is likely to place a reference to a Java object on the execution stack, the method proceeds to operation 806 where processing is performed in a similar manner as described above. When it is determined that there is not at least one command that is likely to place a reference to a Java object on the execution stack, the method 800 ends.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method of tracking references that are likely to be the only references to a plurality of objects stored in an object-oriented programming environment, said method comprising:

determining whether a command is likely to place a reference to an object on an execution stack which is used to execute computer program code in said object-oriented programming environment;

determining whether there is a change in the flow control between the time command is likely to place said reference to said object on said execution stack and the time said reference is used to access said object when said determining determines that said command is likely to place said reference to said object on said execution stack;

translating said command into another command that indicates that it is likely that said reference is the only reference to said object when said determining determines that said command is likely to place said reference to said object on said execution stack and said determining determines that there is a change in the flow control between the time said command is likely to place the reference to said object on said execution stack and the time said reference is used to access said object, thereby effectively indicating that said another command is likely to place the only reference to said object on said execution stack;

executing said another command; and placing said reference to said object on a reference stack associated with said execution stack when said another command is executed, wherein said reference stack is not used to execute computer program code and is designated to store only references that are likely to be the only references to various objects stored in a heap, thereby storing a reference that is likely to be the only reference to a particular object on said reference stack.

2. A method as recited in claim 1, wherein said object-oriented programming environment is a Java compliant operating environment.

3. A method as recited in claim 2, wherein said determining of whether a command is likely to place a reference on said execution stack is performed during Java Bytecode verification.

4. A method as recited in claim 3, wherein said determining of whether a command is likely to place a reference on said execution stack operates to determine whether a Getfield, Aload, Getstatic, or Return command is being performed.

5. A method as recited in claim 4, wherein said method further comprises:

determining whether a Putfield command is likely to overwrite a reference to an object on the execution stack before said reference is used when said determining determines that there is not a change in the flow control; and translating said command into another command when said determining determines that there is a Putfield command is likely to overwrite a reference to an object on the execution stack before said reference is used.

6. A method as recited in claim 1, wherein said reference stack and said execution stack have the same size.

7. A method as recited in claim 1, wherein at least one reference to an object is stored in an entry with an offset that is the same as the offset used to store said at least one reference in said execution stack, when said another command is executed.

8. A computing system capable of tracking references that are likely to be the only references to a plurality of objects stored in an object-oriented programming environment, said computing system is capable of operating to:

determine whether a command is likely to place a reference to an object on an execution stack which is used to execute computer program code in said object-oriented programming environment;

determine whether there is a change in the flow control between the time command is likely to place said reference to said object on said execution stack and the time said reference is used to access said object when said determining determines that said command is likely to place said reference to said object on said execution stack;

translate said command into another command that indicates that it is likely that said reference is the only reference to said object when said determining determines that said command is likely to place said reference to said object on said execution stack and said determining determines that there is a change in the flow control between the time said command is likely to place the reference to said object on said execution stack and the time said reference is used to access said object, thereby effectively indicating that said another command is likely to place the only reference to said object on said execution stack;

execute said another command; and place said reference to said object on a reference stack associated with said execution stack when said another command is executed, wherein said reference stack is not used to execute computer program code and is designated to store only references that are likely to be the only references to various objects stored in a heap, thereby storing a reference that is likely to be the only reference to a particular object on said reference stack.

9. A computing system as recited in claim 8, wherein said object-oriented programming environment is a Java compliant operating environment.

10. A computing system as recited in claim 8, wherein said determining of whether a command is likely to place a reference on said execution stack is performed during Java Bytecode verification.

11. A computing system as recited in claim 8, wherein said determining of whether a command is likely to place a reference on said execution stack operates to determine whether a Getfield, Aload, Getstatic, or Return command is being performed.

12. A computing system as recited in claim 8, wherein said method further comprises:

determining whether a Putfield command is likely to overwrite a reference to an object on the execution stack before said reference is used when said determining determines that there is not a change in the flow control; and translating said command into another command when said determining determines that there is a Putfield command is likely to overwrite a reference to an object on the execution stack before said reference is used.

13. A computing system as recited in claim 8, wherein said reference stack and said execution stack have the same size.

14. A computing system as recited in claim 8, wherein at least one reference to an object is stored in an entry with an offset that is the same as the offset used to store said at least one reference in said execution stack, when said another command is executed.

15. A computer readable medium including computer program code for tracking references that are likely to be the only references to a plurality of objects stored in an object-oriented programming environment, said computer readable medium comprising:

computer program code for determining whether a command is likely to place a reference to an object on an execution stack which is used to execute computer program code in said object-oriented programming environment;

computer program code for determining whether there is a change in the flow control between the time command is likely to place said reference to said object on said execution stack and the time said reference is used to access said object when said determining determines that said command is likely to place said reference to said object on said execution stack;

computer program code for translating said command into another command that indicates that it is likely that said reference is the only reference to said object when said determining determines that said command is likely to place said reference to said object on said execution stack and said determining determines that there is a change in the flow control between the time said command is likely to place the reference to said object on said execution stack and the time said reference is used to access said object, thereby effectively indicating that said another command is likely to place the only reference to said object on said execution stack;

computer program code for executing said another command; and computer program code for placing said reference to said object on a reference stack associated with said execution stack when said another command is executed, wherein said reference stack is not used to execute computer program code and is designated to store only references that are likely to be the only references to various objects stored in a heap, thereby storing a reference that is likely to be the only reference to a particular object on said reference stack.

16. A computer readable medium as recited in claim 15, wherein said object-oriented programming environment is a Java compliant operating environment.

17. A computer readable medium as recited in claim 15, wherein said determining of whether a command is likely to place a reference on said execution stack is performed during Java Bytecode verification.

18. A computer readable medium as recited in claim 15, wherein said determining of whether a command is likely to place a reference on said execution stack operates to determine whether a Getfield, Aload, Getstatic, or Return command is being performed.

19. A computer readable medium as recited in claim 15, wherein said method further comprises:

determining whether a Putfield command is likely to overwrite a reference to an object on the execution stack before said reference is used when said determining determines that there is not a change in the flow control; and translating said command into another command when said determining determines that there is a Putfield command is likely to overwrite a reference to an object on the execution stack before said reference is used.

20. A computer readable medium as recited in claim 19, wherein said reference stack and said execution stack have the same size.

21. A computer readable medium as recited in claim 15, wherein at least one reference to an object is stored in an entry with an offset that is the same as the offset used to store said at least one reference in said execution stack, when said another command is executed.

* * * * *

UNITED STATES PATENT AND TRADEMARK OFFICE
CERTIFICATE OF CORRECTION

PATENT NO. : 7,065,747 B2 Page 1 of 1
APPLICATION NO. : 09/851554
DATED : June 20, 2006
INVENTOR(S) : Sokolov et al.

It is certified that error appears in the above-identified patent and that said Letters Patent is hereby corrected as shown below:

In the Specification

Column 8, line 35, delete "808" before "810".

Signed and Sealed this

Twenty-first Day of November, 2006

JON W. DUDAS
*Director of the United States Patent and Trademark Office*